2,872,986

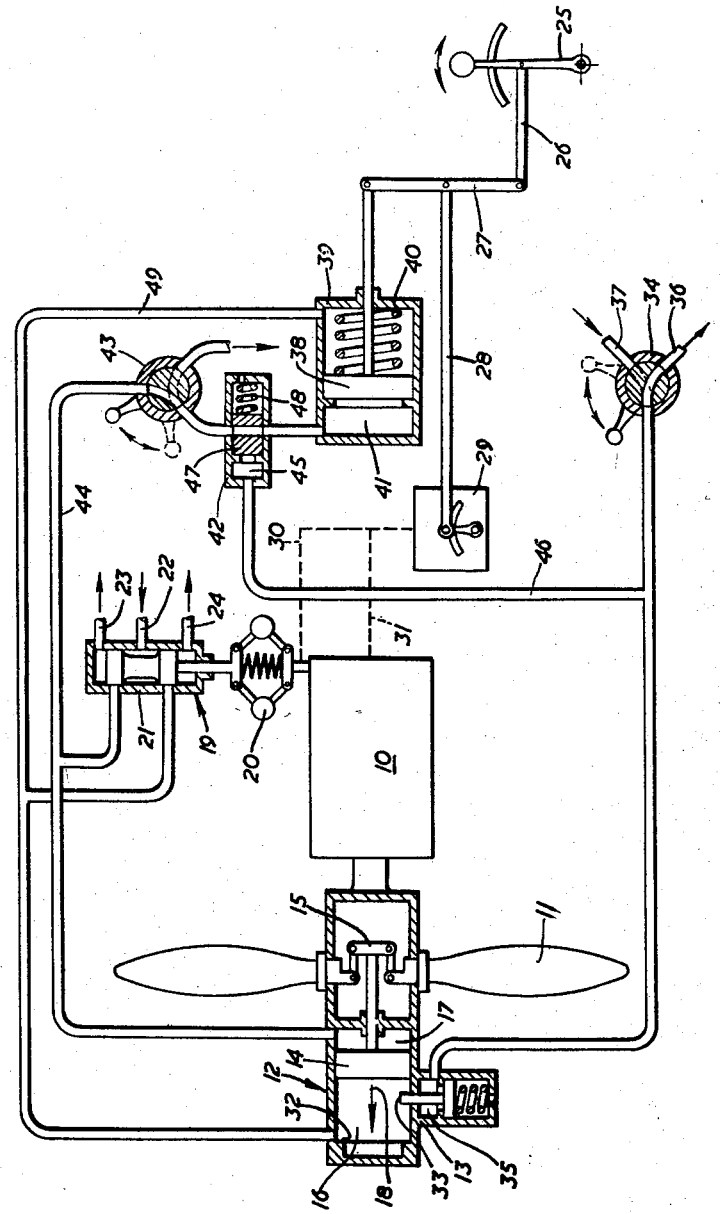
INVENTOR
HERBERT K. CARTWRIGHT

United States Patent Office 2,872,986
Patented Feb. 10, 1959

CONTROL APPARATUS FOR AIRCRAFT PROPULSION UNITS EMBODYING VARIABLE PITCH CONSTANT SPEED AIRSCREWS

Herbert K. Cartwright, Harpenden, England, assignor to D. Napier & Son Limited, London, England, a British company Application April 26, 1956, Serial No. 580,920

5 Claims. (Cl. 170—135.74)

This invention relates to control apparatus for aircraft propulsion units of the kind embodying a variable pitch constant speed air screw controlled by a governor normally to maintain constant the engine speed at any governor setting and of the kind in which there are associated with the air screw pitch control apparatus one or more movable stops so arranged that the stop, or each stop, when in its operative position limits the movement of the pitch control apparatus in the direction in which it reduces air screw pitch.

Such a stop may be provided for example to improve the take-off performance of an aircraft by preventing a pitch reduction below some predetermined figure which might otherwise take place under these conditions or to safeguard the aircraft during take-off or other conditions by preventing a reduction in pitch such as would give high propeller drag if engine failure should occur. In any case the stop or each stop must be movable into an inoperative position when desired so as to permit reduction in pitch below the minimum set by it when conditions warrant, for example for starting, taxiing or like conditions.

Normally the procedure should be to bring a stop provided for the above purpose into operation prior to take-off and maintain it in its operative position throughout flying conditions, thus preventing undesirable pitch reduction should the engine fail. In some cases however the characteristics of the engine may be such that if the stop is maintained in its operative position and the engine power control apparatus is moved into a position representing a power output below a predetermined value, for example when approaching to land, the pitch as set by the stop may be sufficiently coarse to cause the propeller to absorb more power than the engine is giving and thus to cause the engine to surge and cease to operate and thus endanger the aircraft.

It is an object of the present invention to provide control apparatus for an aircraft propulsion unit of the kind referred to which will minimise or overcome this difficulty.

Control apparatus according to the present invention, for a propulsion unit for aircraft embodying a variable pitch airscrew controlled by a governor normally to maintain constant engine speed at any governor setting and having one or more removable stops associated with the air screw pitch control apparatus and arranged so that the stop, or each stop, when in its operative position limits the movement of the pitch control apparatus in the direction in which it reduces air screw pitch, includes an interconnection between the pitch control apparatus and the power control mechanism of the power unit such that, when movement of the pitch control apparatus is prevented by a stop, the power control mechanism is automatically restrained from occupying a position corresponding to a power output below a predetermined value capable of maintaining stable engine operation at the pitch setting determined by that stop.

If, therefore, with a stop in its operative position the pitch control apparatus comes into engagement with the stop, indicating that it is attempting to reduce the pitch still further, any attempt at such further reduction of the pitch will result in the application of an appropriate restraint upon the power control mechanism of the engine to enforce the maintenance of a sufficient power output for stable engine operation at that pitch.

The most commonly used pitch control apparatus for air screws is of the hydraulic type. When the invention is applied to control apparatus for an aircraft propulsion unit of the kind referred to embodying such hydraulic pitch control apparatus the automatic restraint upon the power control mechanism of the unit to prevent reduction of the power output below the said predetermined value when the pitch control apparatus engages a stop is conveniently brought about by apparatus responsive to the rise in pressure in the appropriate chamber of the hydraulic pitch control apparatus which occurs when the pitch control apparatus attempts to reduce the pitch below the limit set by the stop.

Normally pitch control apparatus for variable pitch air screws includes a fixed, so called, "starting stop" against which the pitch control apparatus bears during the starting period so as to maintain the pitch at an appropriate fine value for starting, and prevent the air screw going into reverse pitch when of the type capable of so doing. It will be apparent that with control apparatus according to the invention in which the rise in hydraulic pressure in the appropriate chamber of the hydraulic pitch control apparatus when that pitch control apparatus engages a stop is used to restrain the power control mechanism and enforce the maintenance of an appropriate power output, similar restraint over the power control mechanism would be exercised by the rise in pressure in such chamber during the starting period due to the action of the fixed starting stop in preventing the pitch control apparatus from moving in the direction to reduce the pitch of the airscrew. According to a further feature of the present invention, when applied to such control apparatus embodying hydraulic pitch control apparatus an over-ride device is provided by which, during the starting of the power unit, automatic restraint upon the power control mechanism in the event of a rise in pressure in the appropriate chamber of the hydraulic pitch control apparatus is prevented.

This over-ride device may be manual or it may be actuated automatically on removal of the removable stop or stops, i. e. when the pitch control apparatus bears against the starting stop.

Where the control apparatus includes two or more removable stops arranged respectively to limit movement of the pitch control apparatus to different degrees, the extent of the restraint placed upon the power control mechanism when the pitch control apparatus engages the stops may be different for the different stops.

The interconnection between the pitch control apparatus and the power control mechanism may be arranged in various ways to exercise the required restraint over the power control mechanism, and in one form of the invention this interconnection alters the relationship between a pilot's control lever and the power control mechanism actuated by this lever.

The invention may be performed in various ways, and one particular form of control apparatus embodying the invention will now be specifically described by way of example with reference to the accompanying drawing, which is a simplified diagram of the apparatus.

In the control apparatus shown in the drawing an aircraft propulsion unit 10 (herein termed "the engine") drives a variable pitch airscrew 11. The blades of the airscrew 11 are mounted in a hub 12 which also accommodates some parts of the pitch control apparatus. The pitch control apparatus is hydraulically operated and is of conventional construction. It includes a cylinder 13 forming part of the hub 12 and in which can slide a piston 14 connected through a linkage 15 with the blades of the airscrew 11. The piston 14 is moved along the cylinder 13 by hydraulic pressure applied either to a chamber 16 in front of the piston or to a chamber 17 behind it. The arrangement is such that when the piston 14 is moved in the forward direction, i. e. in the direction of the arrow 18, it reduces the pitch of the airscrew, whereas when it is moved rearwardly, i. e. in the opposite direction to the arrow 18, it increases or coarsens the airscrew pitch.

The pitch control apparatus also includes a control unit 19, herein termed the constant speed unit, comprising a speed-sensitive governor 20 driven by the engine 10 and a hydraulic control valve 21 which controls the admission of hydraulic fluid under pressure from a pipe 22 to the chamber 16 or the chamber 17 respectively, and likewise controls the discharge of hydraulic fluid through drain pipes 23 or 24 from either of the chambers 16 or 17 whenever the other is being supplied with hydraulic fluid under pressure. The arrangement is such that should the engine speed increase above the value to which the governor 20 is set, the governor will lower the piston of the control valve 21 thereby admitting hydraulic fluid under pressure to the chamber 16 and opening the chamber 17 to the drain 23 so that the airscrew pitch is coarsened. This increases the load on the engine and tends to restore its speed to the governed value. Should the engine speed fall below the governed value, the airscrew pitch is reduced in a similar manner.

To vary the governed engine speed the setting of the governor 20 can be adjusted by means of a pilot's control lever 25 through a link 26, a differential lever 27, a link 28, engine power control mechanism 29, and an operative connection 30 between the power control mechanism 29 and the governor 20. The power control mechanism 29 also makes an appropriate adjustment of the fuel supply to the engine through an operative connection 31.

In the airscrew hub 12 there is a fixed stop 32 (herein termed "the starting stop") which determines the minimum pitch to which the airscrew can be set. When the engine is being started or idled the piston 14 is forced against this stop by fluid pressure in the chamber 17 so that the airscrew blades are held at this fine pitch, thereby affording the minimum resistance to rotation. It is a characteristic of variable pitch airscrews that if the blades were freed from control they would tend to take up a fine pitch position. If this occurred in flight it would result in an immediate fall in propulsive power which might endanger the aircraft. To avoid this risk a removable stop 33 is provided in the hub 12 which limits the extent to which the piston 14 can move in the fine pitch direction. This removable stop is under the control of the pilot through a manual control valve 34, the arrangement being such that when the control valve 34 is in the position shown in full lines a chamber 35 controlling the removable stop is vented to a drain pipe 36 so that the stop is advanced by spring pressure or fluid pressure behind it into its operative position as shown in the drawing. In the ordinary way the pilot would bring the removable stop 33 in its operative position prior to take-off and would leave it there, since a finer pitch than that corresponding to this stop would not normally be required in flight. For starting, however, it is necessary to remove the removable stop 33 so that the piston 14 can move up against the starting stop 32, and set the airscrew blades into the fine pitch position. For this purpose the control valve 34 is moved into the position shown in dotted lines in the drawing, whereby hydraulic pressure fluid from a pipe 37 is admitted to the chamber 35, thereby withdrawing the removable stop 33 from the cylinder 13.

While a finer pitch than that corresponding to the removable stop 33 would not be required in normal operation there is a risk that if the power control mechanism 29 were actuated to set the engine to run at a low speed and power output, such for instance as might occur when the aircraft is coming in to land, the airscrew could not be set by the constant speed unit into a fine pitch position corresponding to this low output owing to the presence of the removable stop 33. In the relatively coarse pitch corresponding to this stop the airscrew might absorb more power than the engine is giving and thus cause the engine to surge or stall and so endanger the aircraft. The present invention avoids this possibility by automatically imposing a restraint upon the power control mechanism 29 when the removable stop 33 is in position in order to prevent the power control mechanism from adjusting the engine output to too low a value for this particular pitch setting. This is achieved by altering the relationship between the pilot's control lever 25 and the power control mechanism 29 when the removable stop 33 is in position. For this purpose the piston 38 of a hydraulic cylinder 39 is connected to one end of the differential lever 27, so that the position of the piston 38 in the cylinder 39 determines the relationship between the pilot's control lever 25 and the power control mechanism 29. The piston 38 is biassed by a spring 40 towards the left as shown in the drawing, and the cylinder space 41 to the left of the piston 38 is normally in communication with the chamber 17 of the airscrew pitch control apparatus through an automatic valve 42 and a pipe 44.

The automatic valve 42 is a hydraulically actuated valve the operating chamber 45 of which is connected by a pipe 46 with the connection between the control valve 34 and the operating chamber 35 of the removable stop 33. When the removable stop 33 is in position as shown, the chamber 35 and the chamber 45 are both vented to the drain 36, and a piston 47 in the valve 42 is urged by a spring 48 or by hydraulic pressure on its right-hand face into the position in which it is shown in the drawing, in which it maintains open the communication between the pipe 44 and the space 41 of the cylinder 39. On the other hand, when the removable stop 33 is withdrawn by moving the control valve 34 into the dotted line position, hydraulic pressure fluid from the pipe 37 is applied through the pipe 46 to the chamber 45, thereby moving the piston 47 to the right in the drawing and closing the communication between the pipe 44 and the cylinder space 41.

The space to the right of the piston 38 communicates with the chamber 16 of the pitch control apparatus through a pipe 49.

The control apparatus works as follows. If, with the removable stop 33 in position, the pilot moves his control lever 25 in the sense of reducing the engine power output to a value, below that which the airscrew absorbs, the engine speed will fall below the governed value and the constant speed unit 19 will try to reduce the airscrew pitch by admitting hydraulic fluid under pressure into the chamber 17 from the pipe 22. However, the piston 14 cannot move past the removable stop 33 at which the airscrew pitch is still relatively coarse. If the engine speed is still below the governed value the pressure in the chamber 17 will build up, and this pressure will be communicated back through the pipe 44 into the space 41 of the cylinder 39. Consequently, the piston 38 will be moved to the right as shown in the drawing, the fluid to the right of it being vented through the pipe 49, the control valve 21 and the drain pipe 24. Consequently, the upper end of the differential lever 27 will be moved to the right as shown in the drawing, thereby altering the relationship between the pilot's control lever 25 and the power control mechanism 29 in the sense of increasing the engine power output at any given control lever setting. The arrangement is such that it is impossible for the engine power output to be reduced below the value of the power absorbed by the airscrew at the pitch corresponding to the removable stop 33 even if the pilot moves the control lever 25 into a position which would normally produce a lower power output.

Instead of the automatic control valve 42 a manual control valve 43 may be provided which, when moved into the position shown in dotted lines, renders the cylinder 39 and associated parts inoperative. If desired, both these valves may be provided, as shown in the drawing.

The automatic control valve 42 thus constitutes an over-ride device. It will be seen that the over-ride device has an operative or closed position in which it shuts off the flow of fluid through passage 44 into the chamber 41, and an inoperative position in which it permits such flow. Similarly, the passage or conduit 44 will be seen to establish with the chamber 41 an operative connection between the control member 38 and the over-ride device 42. Thus, when over-ride device 42 is in its closed or operative position, this will result in maintaining the control member 38 in its inoperative position, in which the power control mechanism 29 may in effect over-ride the then inoperative control member 38 to set a suitable engine power output to permit starting and/or idling of the engine.

What I claim as my invention and desire to secure by Letters Patent is:

1. Control apparatus for an aircraft engine driving a variable pitch airscrew, comprising airscrew pitch control apparatus, a governor driven by said engine, an operative connection between said governor and said pitch control apparatus for influencing said pitch control apparatus to adjust the airscrew pitch so as to maintain constant engine speed at any governor setting, at least one removable stop associated with said pitch control apparatus, means for removing said stop into an inoperative position from an operative position in which said stop prevents movement of said pitch control apparatus in the fine pitch direction beyond a relatively coarse pitch position, power control mechanism for said engine, a control member operatively connected to said power control mechanism and adjustable between an inoperative position in which it does not effect said power control mechanism and an operative position in which it restrains said power control mechanism from setting an engine power output below a value capable of maintaining stable engine operation at the relatively coarse airscrew pitch determined by said removable stop, and an interconnection between said pitch control apparatus and said control member for moving said control member into its operative position when said governor influences said pitch control apparatus in the sense of reducing the aircrew pitch but the response of said pitch control apparatus to such influence is prevented by said removable stop being in its operative position.

2. Control apparatus according to claim 1 in which said pitch control apparatus is hydraulic and includes a control valve actuated by said governor for admitting fluid under pressure into a chamber of said pitch control apparatus when said governor requires a reduction in airscrew pitch, said control member is also hydraulic, and said interconnection comprises a passage from said chamber to said control member whereby said control member is moved by hydraulic pressure into its operative position when the pressure in said chamber exceeds the pressure required to reduce the airscrew pitch with the removable stop removed.

3. Control apparatus according to claim 1 in which said pitch control apparatus includes a fixed starting stop which prevents movement of said pitch control apparatus in the fine pitch direction beyond a fine pitch position appropriate for starting the engine, and which includes an over-ride device having an operative position and an inoperative position, an operative connection between said over-ride device and said control member which when said over-ride device is in said operative position, maintains said control member in its inoperative position to permit starting of said engine.

4. Control apparatus according to claim 3 in which there is an interconnection between said over-ride device and said means for removing said removable stop such that said over-ride device is actuated automatically on removal of the removable stop.

5. Control apparatus according to claim 1 in which there is a pilot's control lever and a connection between said pilot's control lever and said power control mechanism, and said control member for said power control mechanism is operative upon said connection to alter the relationship between the setting of said pilot's control lever and the engine power output as determined by said power control mechanism.

References Cited in the file of this patent
UNITED STATES PATENTS 2,477,868    Forman _____ Aug. 2, 1949
2,759,549    Best _____ Aug. 21, 1956